(12) United States Patent
Yamaguchi et al.

(10) Patent No.: US 8,403,554 B2
(45) Date of Patent: Mar. 26, 2013

(54) SCREW FOR EXTRUDER, BEARING SEGMENT USED IN THE SAME AND TWIN SCREW EXTRUDER PROVIDED WITH SCREW FOR EXTRUDER

(75) Inventors: Kazuo Yamaguchi, Takasago (JP); Yasuaki Yamane, Takasago (JP); Shoji Yoshimura, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 669 days.

(21) Appl. No.: 11/940,007

(22) Filed: Nov. 14, 2007

(65) Prior Publication Data

US 2008/0181051 A1 Jul. 31, 2008

(30) Foreign Application Priority Data

Jan. 26, 2007 (JP) .................................. 2007-016361

(51) Int. Cl.
*B29C 47/40* (2006.01)
(52) U.S. Cl. .............. 366/82; 366/85; 366/90; 425/204; 425/208
(58) Field of Classification Search .................... 366/81, 366/82, 85, 89, 90; 425/204, 208
See application file for complete search history.

(56) References Cited

U.S. PATENT DOCUMENTS

| | | | | |
|---|---|---|---|---|
| 2,595,455 A | * | 5/1952 | Heston | 366/89 |
| 2,670,188 A | * | 2/1954 | Erdmenger | 366/97 |
| 2,744,287 A | * | 5/1956 | Parshall | 425/208 |
| 2,910,726 A | * | 11/1959 | Parshall | 425/333 |
| 3,195,868 A | * | 7/1965 | Loomans | 366/85 |
| 3,287,477 A | * | 11/1966 | Vesilind | 264/53 |
| RE26,147 E | * | 1/1967 | Marshall et al. | 366/80 |
| 3,335,461 A | * | 8/1967 | Schwartz | 222/380 |
| 3,416,774 A | * | 12/1968 | Fritsch | 366/90 |
| 3,486,192 A | * | 12/1969 | Roy | 366/82 |
| 3,499,186 A | * | 3/1970 | Sassa | 425/4 R |
| 3,525,124 A | * | 8/1970 | Ocker | 425/204 |
| 3,608,868 A | * | 9/1971 | Koch | 366/82 |
| 3,618,902 A | * | 11/1971 | Brennan, Jr. | 366/301 |

(Continued)

FOREIGN PATENT DOCUMENTS

| CN | 1721157 A | | 1/2006 |
|---|---|---|---|
| JP | 02034307 A | * | 2/1990 |

OTHER PUBLICATIONS

Office Action issued Dec. 9, 2011, in Chinese Patent Application No. 200810003279.3 (with English-language translation).

(Continued)

*Primary Examiner* — David Sorkin
(74) *Attorney, Agent, or Firm* — Oblon, Spivak, McClelland, Maier & Neustadt, L.L.P.

(57) ABSTRACT

In a screw for extruder, a bearing segment having a function of supporting a screw main body at an intermediate part when kneading is performed is provided at a position corresponding to a kneading portion or on the downstream side of the kneading portion. The bearing segment is provided with at least two flights having a sectional shape of a complete meshing type with one streak in the axial direction, the flights are arranged in the rotational direction with uniformly displacing a phase thereof respectively, and length of the flights in the axial direction is set to 0.2D (D: rotational outer diameter of the bearing segment) or more. According to the above configuration, bending of the screw main body is prevented and abrasion of the flights and a barrel is suppressed.

9 Claims, 8 Drawing Sheets

U.S. PATENT DOCUMENTS

| | | | | |
|---|---|---|---|---|
| 3,685,804 A * | 8/1972 | Stansfield | | 366/75 |
| 3,719,350 A * | 3/1973 | Loomans | | 366/75 |
| 3,721,427 A * | 3/1973 | Upmeier | | 366/82 |
| 3,744,770 A * | 7/1973 | Ocker et al. | | 366/82 |
| 3,749,375 A * | 7/1973 | Hermann et al. | | 366/82 |
| 3,814,563 A * | 6/1974 | Slaby et al. | | 425/203 |
| 3,823,921 A * | 7/1974 | Brennan et al. | | 366/80 |
| 3,881,708 A * | 5/1975 | Carle | | 366/82 |
| 3,884,452 A * | 5/1975 | Britten et al. | | 366/77 |
| 3,889,932 A * | 6/1975 | Brandis et al. | | 366/82 |
| 3,981,658 A * | 9/1976 | Briggs | | 425/205 |
| 4,094,942 A * | 6/1978 | Nakai et al. | | 264/102 |
| 4,099,897 A * | 7/1978 | Takano et al. | | 425/4 C |
| 4,110,843 A * | 8/1978 | Skidmore | | 366/76.4 |
| 4,118,164 A * | 10/1978 | Wenger et al. | | 425/202 |
| 4,184,773 A * | 1/1980 | Ellwood | | 366/91 |
| 4,408,887 A * | 10/1983 | Yamaoka | | 366/75 |
| 4,730,935 A * | 3/1988 | Kolossow | | 366/82 |
| 4,744,669 A * | 5/1988 | Kowalczyk et al. | | 366/77 |
| 4,752,135 A * | 6/1988 | Loomans | | 366/85 |
| 4,779,989 A * | 10/1988 | Barr | | 366/90 |
| 4,842,414 A * | 6/1989 | Dray | | 366/82 |
| 4,875,847 A * | 10/1989 | Wenger et al. | | 425/204 |
| 4,957,372 A * | 9/1990 | Meyer | | 366/76.1 |
| 5,048,971 A * | 9/1991 | Wall et al. | | 366/85 |
| 5,129,729 A * | 7/1992 | Geyer | | 366/81 |
| 5,332,314 A * | 7/1994 | Geyer | | 366/82 |
| 5,348,388 A * | 9/1994 | Geyer | | 366/80 |
| 5,352,539 A * | 10/1994 | Psiuk | | 428/558 |
| 5,370,456 A * | 12/1994 | Yamaoka | | 366/80 |
| 5,573,331 A * | 11/1996 | Lin | | 366/81 |
| 5,573,332 A * | 11/1996 | Weihrich et al. | | 366/85 |
| 5,589,203 A * | 12/1996 | Sato | | 425/147 |
| 5,641,227 A * | 6/1997 | Geyer | | 366/78 |
| 5,728,337 A | 3/1998 | Yoshikawa et al. | | |
| 5,965,173 A * | 10/1999 | Goldup | | 425/205 |
| 6,116,770 A * | 9/2000 | Kiani et al. | | 366/82 |
| 6,170,975 B1 * | 1/2001 | Andersen | | 366/82 |
| 6,179,460 B1 * | 1/2001 | Burkhardt et al. | | 366/82 |
| 6,682,213 B2 * | 1/2004 | Inoue et al. | | 366/76.4 |
| 6,783,270 B1 * | 8/2004 | Padmanabhan | | 366/82 |
| 7,566,163 B2 * | 7/2009 | Inoue | | 366/81 |
| 2001/0019729 A1 * | 9/2001 | Inoue | | 425/204 |
| 2002/0093118 A1 * | 7/2002 | Inoue et al. | | 264/211.23 |
| 2006/0003042 A1 | 1/2006 | Inoue et al. | | |

OTHER PUBLICATIONS

Office Action issued Sep. 13, 2010, in State Intellectual property Office, P.R. China, Patent Application No. 200810003279.3, Application date Jan. 28, 2008 (with English-language Translation).

* cited by examiner

POSITION IN THE AXIAL DIRECTION

POSITION IN THE AXIAL DIRECTION

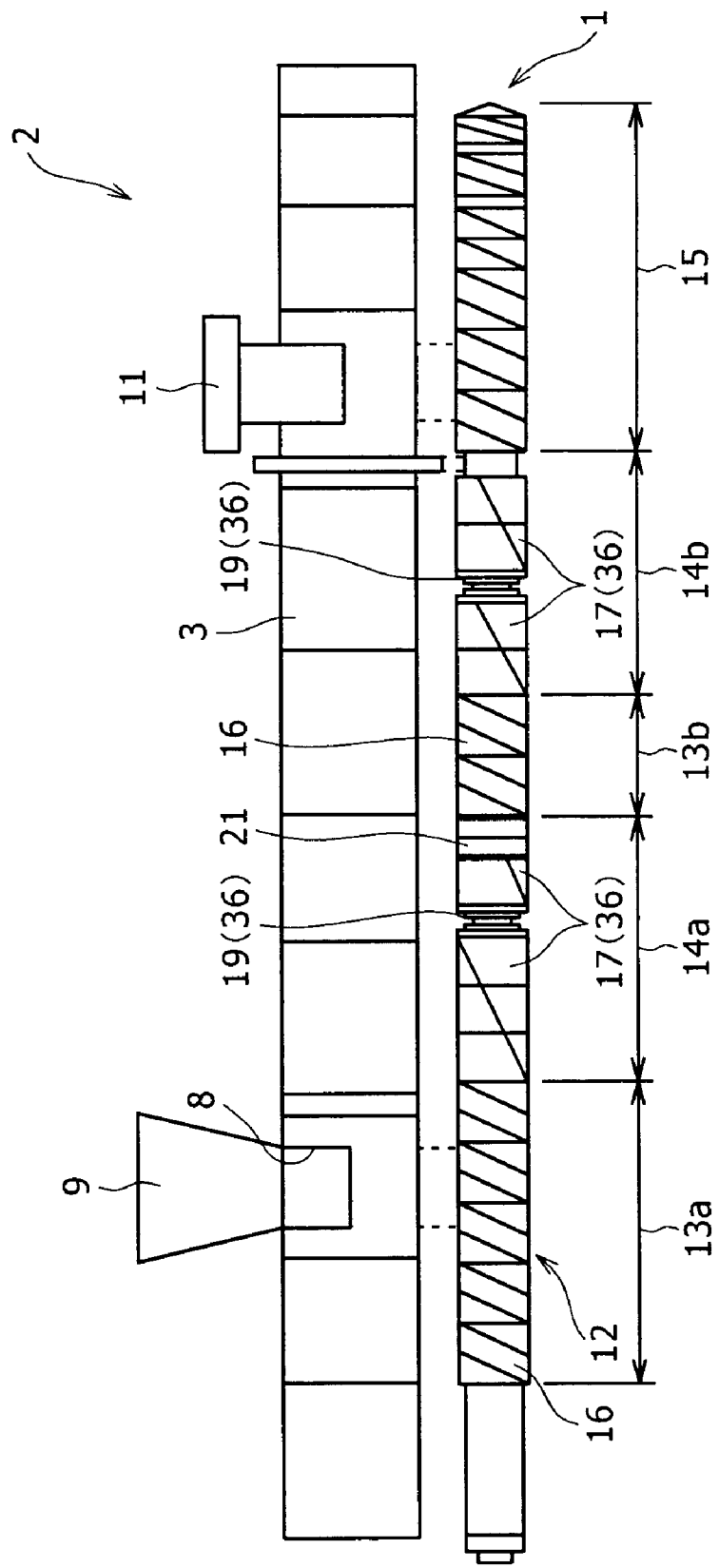

SCREW FOR EXTRUDER, BEARING SEGMENT USED IN THE SAME AND TWIN SCREW EXTRUDER PROVIDED WITH SCREW FOR EXTRUDER

BACKGROUND OF THE INVENTION

1. Field of the Invention

The present invention relates to a screw for extruder provided with a bearing segment supporting a screw main body in order not to move the screw main body during kneading, the bearing segment used in the above screw for extruder, and a twin screw extruder provided with the above screw for extruder.

2. Description of the Related Art

In the case where a composite resin material is extruded, kneading is performed by adding a base material of a thermal plastic resin with an additive agent such as filler or a different synthetic resin. In such kneading, a continuous extruder is often used.

A known continuous extruder is provided with a barrel having a long hollow portion (chamber) along the axial direction and a screw body passing through the hollow portion in the axial direction, and is a single screw extruder or a twin screw extruder in accordance with the number of the screw body.

The continuous extruder is to supply a material to be kneaded into the barrel and rotate the screw body by a motor or the like so as to knead the material to be kneaded. In the screw body, a plurality of segments are coupled to each other in the axial direction, and specific flights are provided in the segments respectively. By the flights, the material to be kneaded is moved from the upstream side to the downstream side and a shear stress which is necessary for the kneading is given.

There are various configurations of the continuous extruder in accordance with a component of the material to be kneaded. However in general, at least one material supply port is provided in the barrel and various fillers, synthetic resins or the like are properly supplied from the material supply port. Therefore, in the screw body is formed a kneading portion provided with a plurality of kneading segments including a kneading disk segment having kneading flights with a large kneading effect and a rotor segment on the slightly downstream side of the material supply port. When the plurality of kneading portions are provided, there is sometimes a case where a plurality of material supply ports are provided in the axial direction in accordance with the kneading portions. In the screw body, is also provided a screw segment having a feeding flight which is suitable for feeding the material to be kneaded towards the downstream side. Then the kneaded material to be kneaded is moved to the downstream side, pressurized and extruded in an extruding portion installed in the vicinity of an end of the downstream.

The kneading is mainly progressed by receiving a shear effect when the material to be kneaded passes through a tip clearance formed between an inner wall of the barrel and a tip part of the kneading flight. Therefore, in order to improve a kneading effect (dispersibility), it is preferable that a gap (tip clearance) provided between the inner wall of the barrel and the tip part of the flights is properly narrowed. In order to improve a kneading effect (distributivity), it is preferable that the gap (tip clearance) is properly widened.

For example, US Patent Laid-Open No. 2006-3042 discloses a technique of a twin screw extruder in which kneading flights with two tip portions (hereinafter sometimes referred to as "streaks") twisting in a spiral shape in the axial direction are adapted in a rotor segment. The flights have a high tip part having a large rotational outer diameter and a low tip part having a small rotational outer diameter. In the high tip part, a tip clearance to an inner wall of a barrel is small, and in the low tip part, the tip clearance is large.

The twin screw extruder is capable of achieving a preferable kneading effect.

However, in the twin screw extruder in general, a large kinetic load is also imposed on a kneading screw as an adverse effect of a high kneading effect. Particularly, a kinetic load imposed on both a kneading segment and a rotor segment of the screw body is very large.

As a result, an axial center of the screw body is bent and a rotational axis of the screw body is easily moved. In the screw body with the moving rotational axis, front ends of the flights are easily brought in contact with the inner wall of the barrel. It can be predicted that the above tendency is remarkable in a kneading portion provided with a kneading segment and a rotor segment having a small tip clearance.

SUMMARY OF THE INVENTION

The present invention is achieved in consideration to the above problems and it is an object of the present invention to provide a screw for extruder capable of kneading a material to be kneaded by giving a large shear force, as well as preventing bending of a screw main body and suppressing abrasion of a flights and a barrel.

It is also an object of the present invention to provide a bearing segment capable of preventing movement of the screw main body.

Further, it is also an object of the present invention to provide a twin screw extruder provided with the above screw for extruder.

In order to achieve the above objects, the following technical means is applied to the screw for extruder according to the present invention.

That is, the screw for extruder according to the present invention comprises a screw segment for conveying a material to be kneaded, a kneading portion including a kneading segment, the kneading segment having kneading flights with two streaks or more for kneading the material to be kneaded which is conveyed by the screw segment, and a bearing segment provided within the kneading portion or on the downstream side of the kneading portion, wherein the bearing segment is provided with at least two flights having a sectional shape of a complete meshing type with one streak in the axial direction, the flights are arranged in the rotational direction with uniformly displacing a phase thereof respectively, and length of the flights in the axial direction is set to 0.2D (D: rotational outer diameter of the bearing segment) or more.

According to the above technical means, front ends of the flights have a large area which opposes to an inner wall of a barrel in the bearing segment, and the material to be kneaded fed to the above front ends exerts a hydrodynamic bearing function of supporting a screw main body being apart at a fixed distance from the inner wall of the barrel. Therefore, the screw for extruder is capable of kneading the material to be kneaded by giving a large shear force, as well as preventing bending of the screw main body and suppressing abrasion of the flights and the barrel.

It should be noted that a rotational outer diameter of the kneading segment is preferably smaller than the rotational outer diameter of the bearing segment.

By this, it is possible to reliably avoid contact of the kneading segment with the inner wall of the barrel and further suppress the abrasion of the flights and the barrel.

In the case where a plurality of the kneading portions are provided in the axial direction of the screw main body being apart from each other, the bearing segment is preferably provided in a first kneading portion located on the most upstream side among the plurality of the kneading portions. Further, preferably, length in the axial direction of the first kneading portion located on the most upstream side among the plurality of the kneading portions provided in the axial direction of the screw main body being apart from each other is 4.5D or more, and the bearing segment is located on the downstream side at a distance of 4.5D or more from an end of the upstream of the first kneading portion. It should be noted that the bearing segment can be located on the downstream side at a distance 3.0D or less from an end of the downstream of the first kneading portion.

According to the above technical means, the bearing segment is provided in the first kneading portion in which melting is not easily progressed and hence a load imposed on the screw main body is large since the first kneading portion is located on the most upstream side among the plurality of the kneading portions. Therefore, it is possible to more effectively prevent the bending of the screw main body, and to further suppress the abrasion of the flights and the barrel. In the case where the length of the first kneading portion in the axial direction is 4.5D or more, the bearing segment is located on the downstream side at a distance of 4.5D or more from an end of the upstream of the first kneading portion so that the supplied material to be kneaded is melted so as to be easily fed to between the front ends of the flights and the inner wall of the barrel. Therefore, the bearing segment can exert a sufficient hydrodynamic bearing function. As mentioned above, the bearing segment is preferably provided at a position corresponding to the kneading portion. However, even if the bearing segment is provided on the downstream side at a distance of 3.0D or less from the end of the downstream of the kneading portion, the bearing segment can sufficiently exert an effect of preventing the bending of the screw main body.

It should be noted that the flights of the bearing segment are preferably formed such that a distance between front ends of the flights and a rotational axis of the bearing segment is gradually reduced towards the front side of the rotational direction of the screw main body. According to the above configuration, when applied to the extruder, a clearance portion is formed such that a clearance is gradually widened between the front ends and the inner wall of the barrel towards the front side of the rotational direction of the screw main body. Therefore, the material to be kneaded is easily introduced to the front ends of the flights by the clearance portion, and more reliably formed into a film shape. Consequently, the hydrodynamic bearing function is exerted and hence it is possible to more reliably suppress the abrasion of the flights and the barrel.

Here, the following technical means is applied to the bearing segment according to the present invention.

That is, the bearing segment according to the present invention is provided with at least two flights having a sectional shape of a complete meshing type with one streak in the axial direction, the flights being arranged in the rotational direction with uniformly displacing a phase thereof respectively, and length of the flights in the axial direction being set to 0.2D (D: rotational outer diameter of the bearing segment) or more.

According to the above technical means, front ends of the flights have a large area which opposes to the inner wall of the barrel, and the material to be kneaded is introduced to between the inner wall of the barrel and the front ends of the flights so that the material to be kneaded exerts the hydrodynamic bearing function of supporting a screw main body being apart at a fixed distance from the inner wall of the barrel, and hence it is possible to suppress the bending of the screw main body and prevent movement. The flights are also formed such that a distance between front ends of the flights and a rotational axis of the bearing segment is gradually reduced towards the front side of the rotational direction of the screw main body. Consequently, when applied to the extruder, a clearance portion is formed such that a clearance is gradually widened between the front ends and the inner wall of the barrel along the rotational direction of the screw main body. Therefore, the material to be kneaded is easily introduced to the front ends of the flights, and it is possible to more reliably suppress the abrasion of the flights and the barrel.

The following technical means of rotating and meshing in the same direction and providing the above screw for extruder is applied to the twin screw extruder according to the present invention.

According to the above technical means, the twin screw extruder is capable of kneading the material to be kneaded by a large shear force and also of suppressing the abrasion of the screw main body and the barrel.

According to the screw for extruder of the present invention, since the bearing segment supporting the screw main body is provided in the kneading portion or in the vicinity of the end of the downstream of the kneading portion, the bearing segment is capable of preventing the bending of the screw main body and kneading the material to be kneaded by adding a large shear force, as well as suppressing the abrasion of the screw main body and the barrel.

According to the bearing segment of the present invention, since the material to be kneaded is introduced to between the inner wall of the barrel and the front ends of the flights, the material to be kneaded can exert the hydrodynamic bearing function of supporting the screw main body being apart at a fixed distance from the inner wall of the barrel and prevent the movement of the screw main body.

According to the twin screw extruder of the present invention, it is possible to knead the material to be kneaded by a large shear force and also suppress the abrasion of the screw main body and the barrel.

BRIEF DESCRIPTION OF THE DRAWINGS

FIG. 8 is a front view of a screw for extruder according to a third embodiment.

DESCRIPTION OF THE PREFERRED EMBODIMENTS

Hereinafter, a description will be given to embodiments of a screw for extruder, a bearing segment used in the screw for extruder, and a twin screw extruder provided with the screw for extruder according to the present invention.

Figure 1:
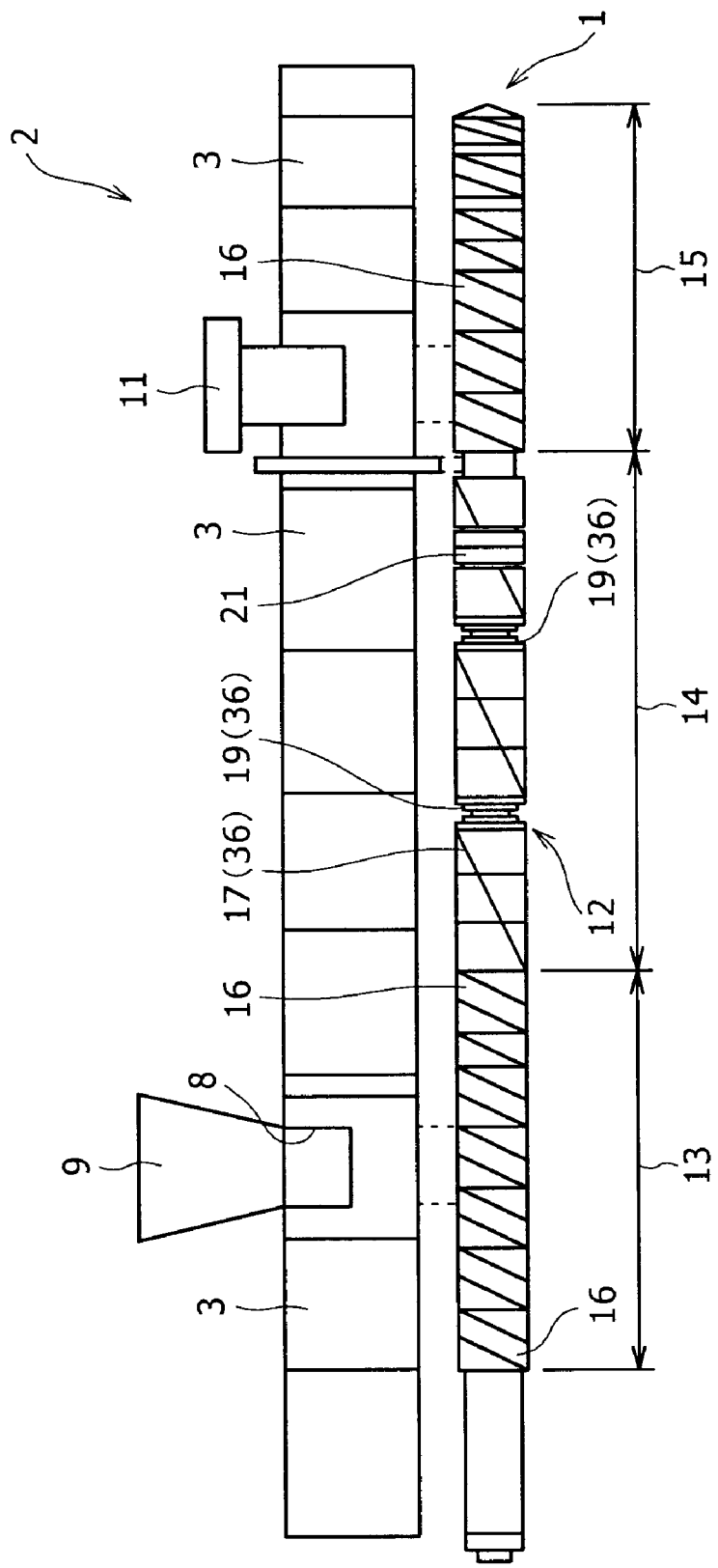
FIG. 1 is a side view of a screw for extruder according to a first embodiment.

FIG. 1 schematically shows a twin screw extruder 2 in which a screw for extruder 1 of the present invention is built. An upper part of the figure is a side view of a barrel 3 for showing a positional relationship between the screw for extruder 1 and the barrel 3. A lower part of the figure is a side view of the screw for extruder 1 housed in the barrel 3. It should be noted that in the following description, the left side (supply side) of FIG. 1 is called as the upstream side and the right side (discharge side) of FIG. 1 is called as the downstream side.

Figure 4:
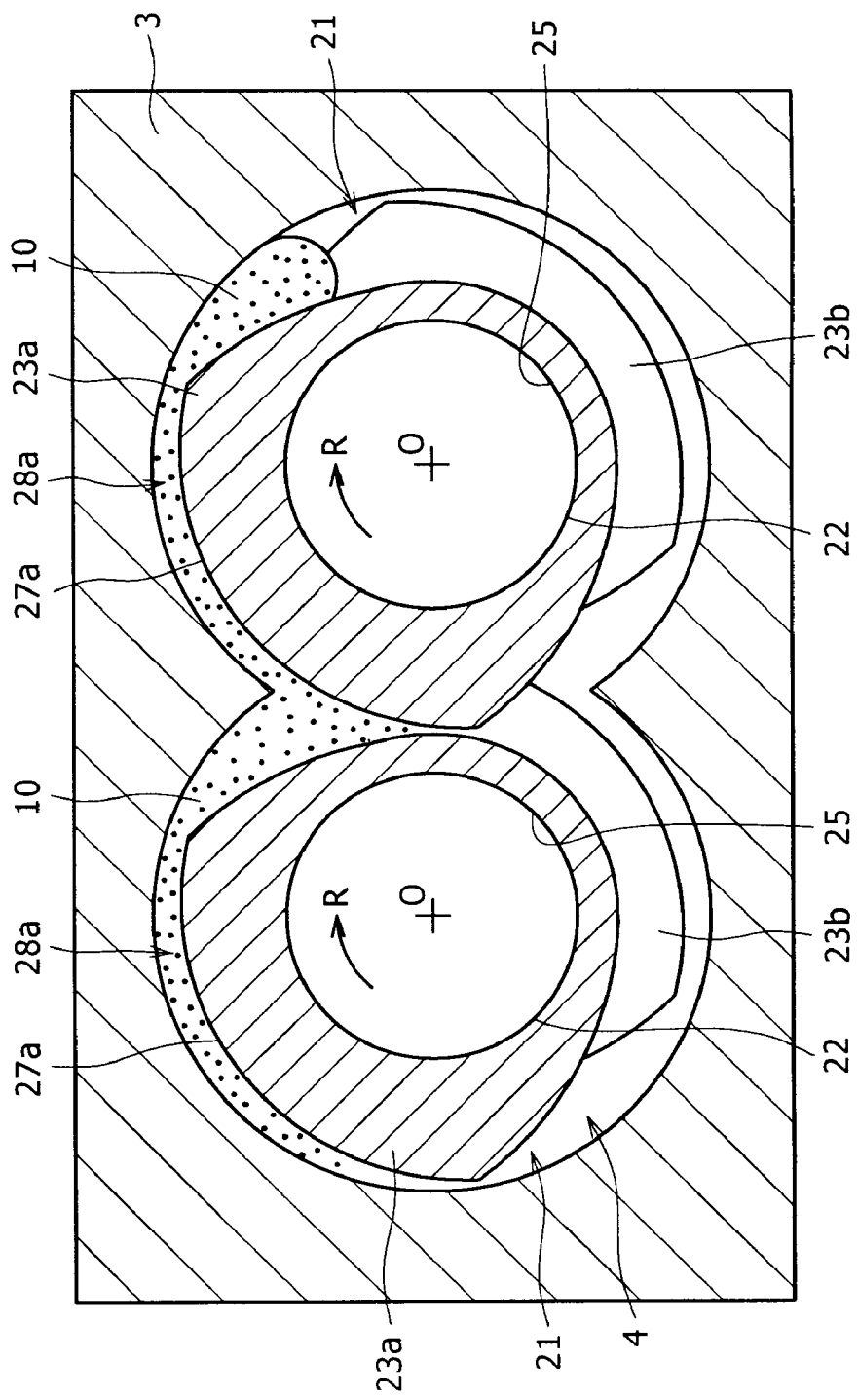
FIG. 4 is a sectional view showing a relationship between the bearing segment and a kneading chamber.

The twin screw extruder 2 has the barrel 3 provided with a hollow portion 4 inside thereof and a pair of left and right screws for extruder 1 housed in the hollow portion 4. The barrel 3 and the screw for extruder 1 are respectively formed by combining a plurality of segments with each other in the axial direction. The hollow portion 4 is formed by cutting out so as to make a cross section thereof into an eyeglasses shape in which a pair of circles are overlapped with each other such that a part of the circumference of the circle is overlapped with a part of the circumference of the other circle between both the circles as shown in FIG. 4.

A material supply port 8 is formed on the upstream side of the barrel 3. A hopper 9 is connected to the material supply port 8. A material to be kneaded 10 put through the hopper 9 is supplied to the hollow portion 4 passing through the material supply port 8. In the barrel 3 on the downstream side of the hopper 9, is provided an electric heater, a heating device using heated oil or the like (not shown). Heat is supplied to the material to be kneaded 10 passing through the inside thereof from the barrel 3, and it is possible to convey the material to be kneaded 10 in a melting state or a half-melting state.

An opening 11 mainly used for removing a volatile component is provided on the downstream side of the barrel 3. The hollow portion 4 is in a communicating state with the inside and the outside thereof through the opening 11. In order to make the inside of the hollow portion 4 a depressurization state and remove the volatile component such as water from the material to be kneaded 10, the opening 11 can be connected to a suction device (not shown) such as a vacuum pump. It should be noted that the opening 11 is properly provided in accordance with kneading conditions, and there is sometimes a case where the opening 11 is not provided in accordance with the kneading conditions, a case where the opening 11 is provided at another position in the axial direction, or a case where the opening 11 is provided at a plurality of positions.

The screw for extruder 1 according to the present invention has a screw main body 12 formed by combining a plurality of segments with each other in the axial direction. The screw main body 12 in which the segments having different functions from each other are combined with each other has a plurality of portions exerting the different functions in the axial direction. In the screw main body 12 according to the present embodiment, are provided a feeding portion 13 for feeding the material to be kneaded 10 to the downstream side, a kneading portion 14 for kneading the material to be kneaded 10, and an extruding portion 15 for pressurizing and extruding the material to be kneaded 10 from the upstream side towards the downstream side.

The feeding portion 13 is formed by coupling a screw segment 16 having feeding flights in the axial direction. The screw segment 16 has a pair of flights (with two streaks) protruding in the different radial directions from one another with sandwiching a rotation center O. The flights twist in a spiral shape in the axial direction. The screw segment 16 has a function of conveying the material to be kneaded 10 fed into a groove portion formed between the flights to the downstream side in accordance with rotation of the screw segment 16.

The kneading portion 14 has a kneading segment 36 provided with kneading flights for kneading the material to be kneaded 10. In the present embodiment, the kneading segment 36 is formed by eight rotor segments 17 and two kneading disk segments 19.

The rotor segment 17 has flights with two streaks twisting in a spiral shape in the axial direction. The kneading is performed by making the material to be kneaded 10 pass through a tip clearance formed between front ends of the flights and an inner wall of the barrel 3, and giving a shear force to the material to be kneaded 10. The rotor segments 17 are formed such that at the front ends of the flights, a high tip part having a small tip clearance and a low tip part having a larger tip clearance than the high tip part emerge one after another in the axial direction and the circumferential direction. By providing the high tip part and the low tip part in the flights, it is possible to perform the kneading by giving the material to be kneaded 10 a kneading effect.

The kneading disk segments 19 have a plurality of kneading flights in a flat plate shape having thickness of $0.1D_1$ ($D_1$: rotational outer diameter of the kneading disk segments 19) in the axial direction protruding differently from one another. A two-streak and wing type in which a tip clearance is smaller than the above rotor segment 17 is adapted for the kneading disk segments 19. Therefore, the material to be kneaded 10 passing through the kneading disk segments 19 is kneaded by removing a large shear force.

The extruding portion 15 is formed by coupling the same screw segment 16 as in the above feeding portion 13 in the axial direction. However, a different point from the above feeding portion 13 is that a pitch of the screw segment 16 in the axial direction is gradually narrowed as moving to the downstream side. Thereby, in the extruding portion 15, feeding speed of the material to be kneaded 10 towards the downstream side is gradually decreased, and the hollow portion 4 is filled with the material to be kneaded 10 so as to be in a pressurized state.

The kneading segment 36 of the kneading portion 14 is formed by the rotor segments 17 and the kneading disk segments 19 with a small tip clearance. The kneading flights are formed so as to give a large shear force to the material to be kneaded 10. However, a very large kinetic load is imposed on the screw main body 12 receiving an influence of a reactive force of the large shear force and thereby the screw main body is easily bent. As a result, in the rotating screw main body 12, a rotational axis of the screw main body 12 is moved and front ends of the kneading flights of the kneading segment 36 are easily brought into contact with the inner wall of the barrel 3. Therefore, in the present invention, a bearing segment 21 supporting the screw main body 12 is provided so as to prevent the screw main body 12 from bending.

A detailed description will be given to the bearing segment 21 with reference to FIGS. 2 to 4 below.

Figure 2A:
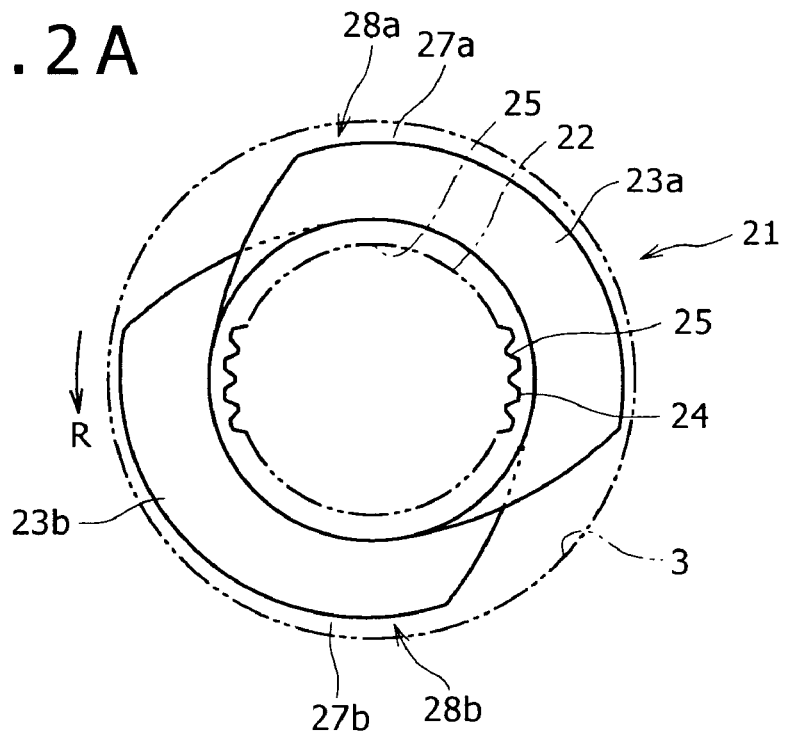
FIG. 2 is a front view in which a bearing segment is seen from the upstream side.
Figure 2B:
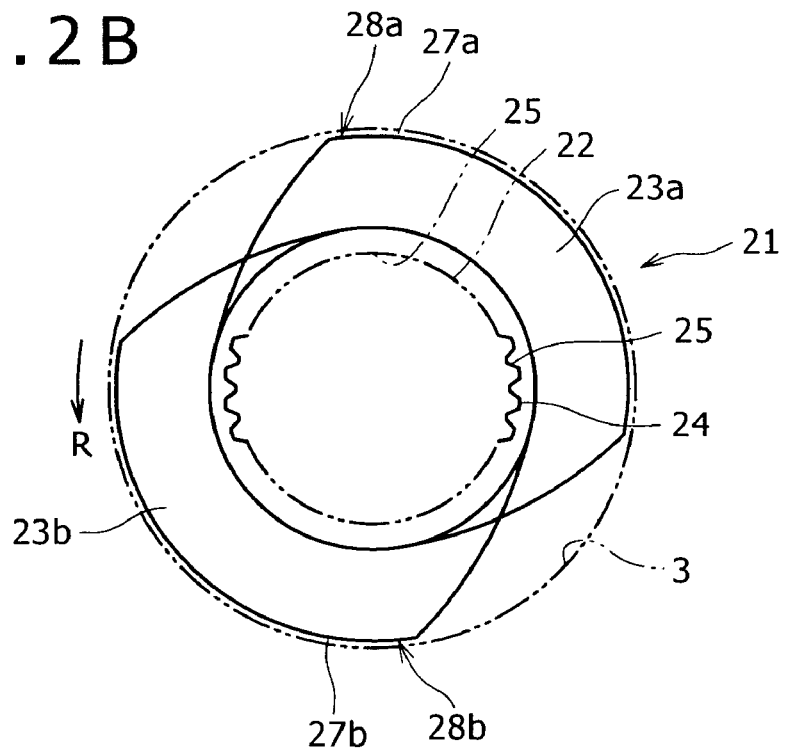
Figure 3:
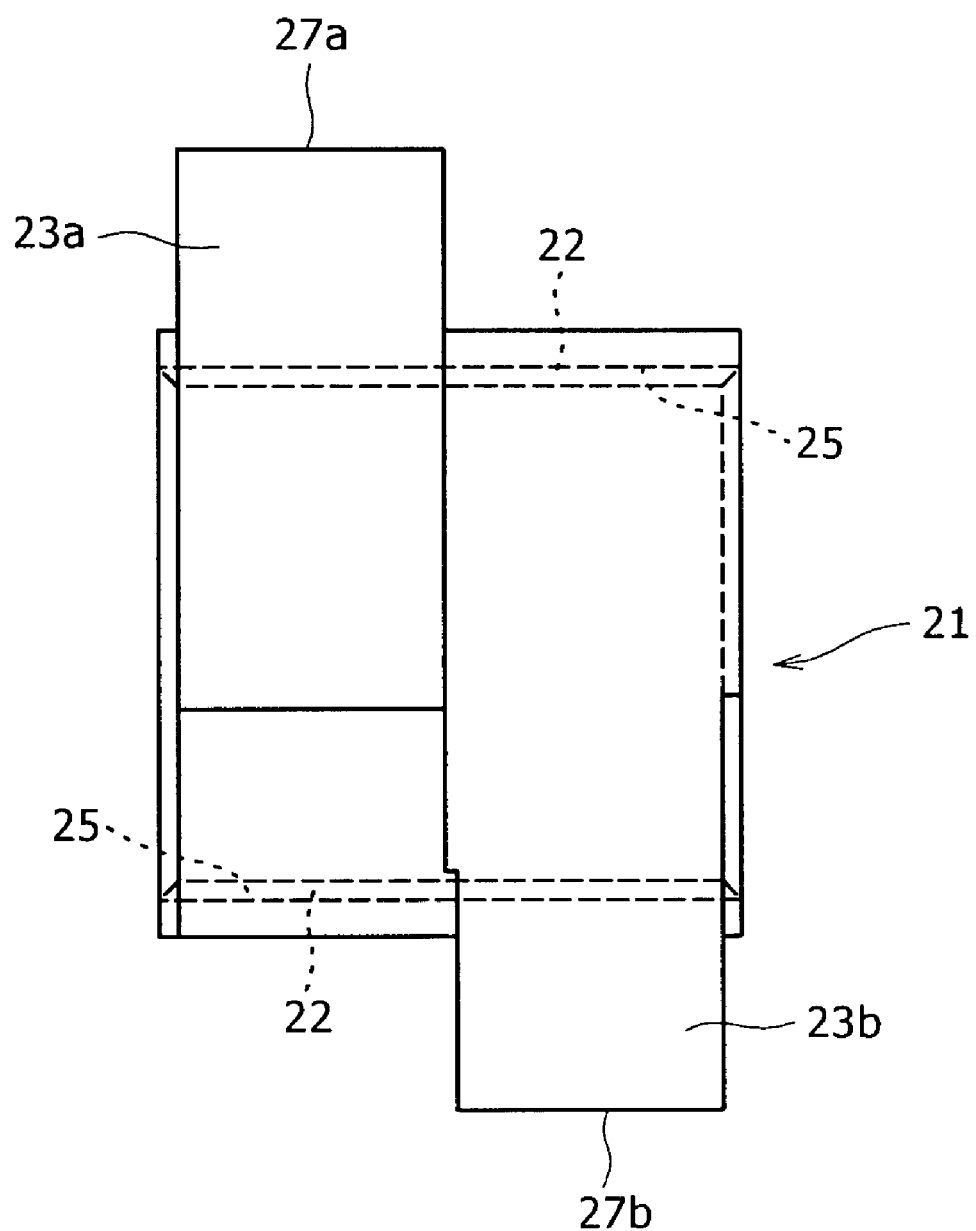
FIG. 3 is a side view of the bearing segment.

FIGS. 2A and 2B are views in which the bearing segment 21 is seen from the axial direction (front views). FIG. 3 is a side view of the bearing segment 21. FIG. 4 is a sectional view showing a relationship between the bearing segment 21 and the barrel 3.

As shown in FIG. 4, the bearing segments 21 are attached to a pair of left and right screw axes 22 so as to be in a state of meshing with each other. The bearing segment 21 is formed by combining two flights 23a and 23b with each other in the axial direction.

An axis hole 25 into which the screw axis 22 can be inserted is formed in base ends of the flights 23a and 23b respectively. On an inner periphery surface of the axis hole 25, is provided a hole spline in which a plurality of tooth grooves over the axial direction are formed along the rotational direction R. In the screw axis 22, is provided an axis spline in which a plurality of teeth corresponding to the tooth grooves of the axis hole 25 are formed on an outer periphery surface. The flights 23a and 23b are rotatably integrated in accordance with rotation of the screw axis 22 towards the rotation direction R.

As shown in FIG. 2A, the flights 23a and 23b are arranged by displacing a phase thereof so as to be equally spaced (with a gap at an equal angle) in the rotational direction R taking the rotational center O of the screw main body 12 as center. That is, in the case where two flights are installed in the axial direction as in the present embodiment, the phase is displaced at 180°, and in the case where three flights are installed, the phase is displaced at 120° so as to create a gap at an equal angle.

As shown in FIGS. 2A to 4, the flights 23a and 23b are one streak disk formed in a plate shape extending in the radial direction. In the case where the rotational outer diameter of the bearing segment 21 is D, thickness of the above disk (maximum thickness) is 0.2D or more in the axial direction. In a general kneading disk, thickness of the disk is 0.1D or less. However, when the disk has one streak with thickness of 0.2D or more, front ends 27a and 27b of the flights 23a and 23b have a large area which opposes to the inner wall surface of the barrel 3 (the hollow portion 4), and hence the melted material to be kneaded 10 is spread in a film shape over the front ends 27a and 27b with the large area so as to support the screw main body 12 as a hydrodynamic bearing.

With the large opposing area of the front ends 27a and 27b of the flights 23a and 23b, even if a force is imposed on the screw main body 12 in the axial direction and the perpendicular direction, it is possible to decrease surface pressure on the front ends 27a and 27b. Therefore, the material to be kneaded 10 in a film shape formed in the front ends 27a and 27b are not easily cut. Consequently, without losing a hydrodynamic bearing function during rotation of the screw, it is possible to suppress abrasion of the flights of the kneading segment 36 and the inner wall of the barrel 3.

The flights 23a and 23b are formed such that a sectional shape thereof is extended towards the inner wall of the barrel 3 taking an axial center of the screw axis 22 as a top. On an outer periphery surface thereof the most apart from the rotational center O of the screw main body 12, are formed the front ends 27a and 27b in an arc shape. The flights 23a and 23b have a sectional shape of a complete meshing type in which one of the left and right front ends 27a and 27b always opposes to a periphery of a body part of the other flights 23a and 23b where any flight is formed. Since the flights 23a and 23b of the bearing segment 21 are the complete meshing type, the material to be kneaded 10 is alternately scraped out by the flights 23a and 23b and self-cleaning is performed. Therefore, stagnancy and deterioration of the material caused by the stagnancy are not generated in the material to be kneaded 10. As a result, generation of contamination caused by the stagnancy is suppressed.

Clearance portions (tip clearances) 28a and 28b are formed between the inner wall of the barrel 3 and the front ends 27a and 27b in the flights 23a and 23b respectively. The clearance portions 28a and 28b are space formed between the front ends 27a and 27b and the inner wall of the barrel 3. The clearance portions 28a and 28b are set such that the narrowest part thereof is set to $0.004D_2$ to $0.01D_2$ ($D_2$: rotational outer diameter of the kneading segment), and along the rotational direction R of the bearing segment 21, the gap between the front ends 27a and 27b and the barrel 3 is gradually widened. Thereby, when the bearing segment 21 is rotated, the material to be kneaded 10 is easily introduced to the clearance portions 28a and 28b from the large inlet side which faces the rotational direction R, and as the gap between the front ends 27a and 27b and the barrel 3 is gradually narrowed, the introduced material to be kneaded 10 can be spread between the front ends 27a and 27b and the barrel 3 without leaving any gap. Therefore, a matter in a film shape of the material to be kneaded 10 is formed in the front ends 27a and 27b and then the material to be kneaded 10 spread in a film shape exerts an effect of the hydrodynamic bearing of the bearing segment 21.

Further, in the bearing segment 21, as shown in FIG. 2B, the clearance portions 28a and 28b can be formed such that the gap between the front ends 27a and 27b of the flights 23a and 23b and the inner wall of the barrel 3 is constant. The gap is preferably set to $0.005D_2$ to $0.02D_2$ ($D_2$: rotational outer diameter of the kneading segment). Thereby, the material to be kneaded 10 is spread between the front ends 27a and 27b and the barrel 3 without leaving any gap, and hence the material to be kneaded 10 spread in a film shape exerts the effect of the hydrodynamic bearing of the bearing segment 21.

It should be noted that the rotational outer diameter of the kneading segment 36 is preferably formed smaller than the rational outer diameter D of the bearing segment 21. In other words, since a rotational outer diameter of flights of the rotor segments 17 and the kneading disk segments 19 is smaller than the rotational outer diameter D of the flights 23a and 23b of the bearing segment 21, it is possible to more reliably prevent contact of the front ends of the flights of the kneading segment 36 with the inner wall of the barrel 3.

According to the screw for extruder 1 of the present invention, since the bearing segment 21 mentioned above is provided at a position in the different axial direction, particularly since a positional relationship with the kneading portion 14 is changed, it is possible to obtain a plurality of embodiments.

That is, the screw for extruder 1 according to the present invention has a screw for extruder 1 of a first embodiment in which the bearing segment 21 is provided within the kneading portion 14 as shown in FIGS. 1 to 4 and 6, a screw for extruder 1 of a second embodiment in which the bearing segment 21 is provided on the downstream side being apart from the kneading portion 14 as shown in FIG. 7, or a screw for extruder 1 of a third embodiment in which when a plurality of kneading portions 14 are provided in the screw for extruder 1, the bearing segment 21 is provided within a first kneading portion 14a located on the most upstream side among the plurality of kneading portions as shown in FIG. 8.

A detailed description will be given to a relationship between an installment position of the bearing segment 21 and an abrasion amount of the screw main body 12 of the screw for extruder 1 according to the first to third embodiments with reference to FIGS. 5 to 8. It should be noted that views on the upper side in FIGS. 5 to 8 (FIGS. 5A to 7A and 8) all show how the segments constituting the screw main body 12 are coupled with each other in the axial direction, and views on the lower side (FIGS. 5B to 7B) show the abrasion amounts for segments at a position in the axial direction.

The above abrasion amounts are calculated after supplying the material to be kneaded 10 (PP: polypropylene) to the twin screw extruder, and continuously operating for a fixed time at the rotation speed of 300 rpm in a state that the barrel 3 is heated to 200° C. The twin screw extruder is an extruder of rotating in the same direction in which two screw main bodies 12 (maximum rotational outer diameter of 72 mm and overall length of 2 m) are provided within the barrel 3.

The abrasion amounts are determined by subtracting mass of a segment of the screw main body 12 after the operation from mass of the segment before the operation, and dividing a value obtained from the above subtraction by the mass of the segment of the screw main body 12 before the operation. The abrasion amount is obtained for each of the pair of left and right screws for extruder 1.

FIG. 5 schematically shows a conventional screw for extruder 29 having no bearing segment 21 as well as FIG. 1. It should be noted that although the bearing segment 21 is not provided in the conventional screw for extruder 29, except for the above point, the same type of segments are provided in the same combination as in the screw for extruder 1 according to the first embodiment.

Figure 5A:
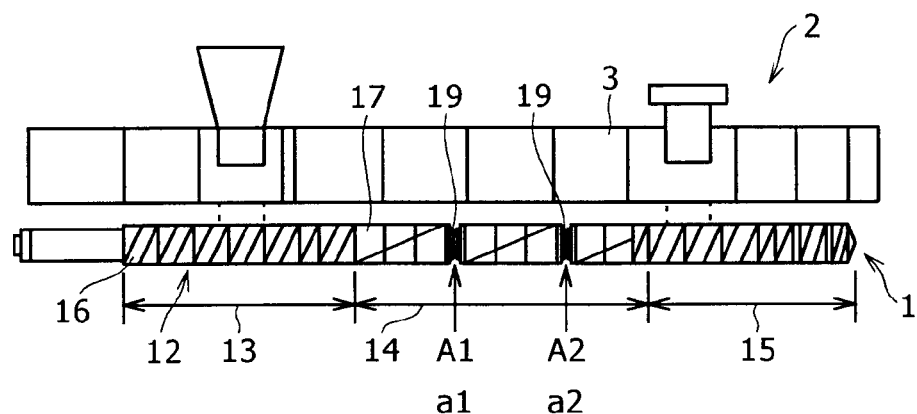
FIG. 5 is a view explaining a change in an abrasion amount in a conventional screw for extruder at a position in the axial direction.
Figure 5B:
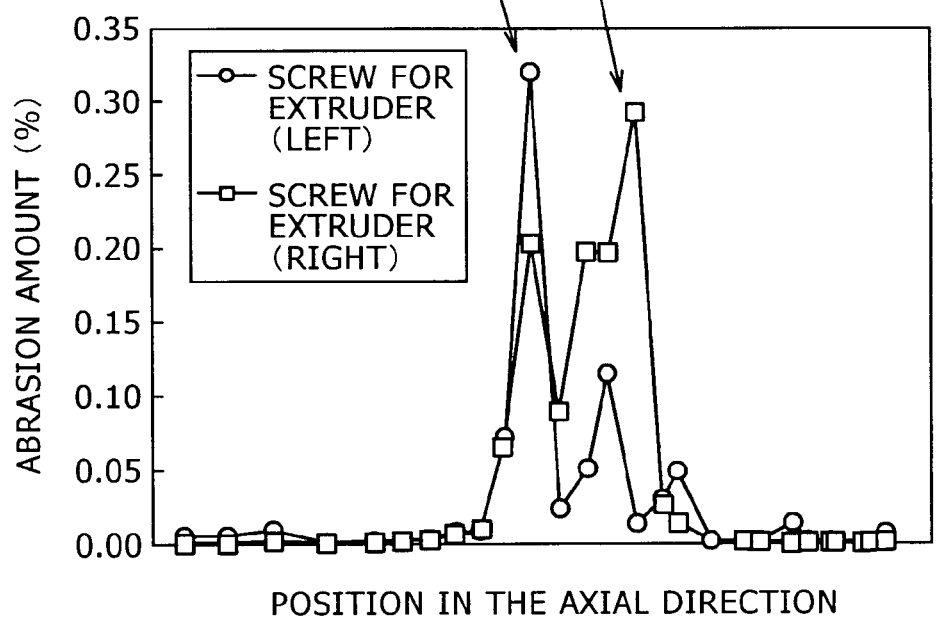

The abrasion amounts of the kneading disk segments 19 provided in A1 and A2 in FIG. 5A are 0.25% or more as shown in a1 and a2 in FIG. 5B. In segments other than A1 and A2 of the kneading portion 14, almost all the abrasion amounts are 0.05% or more. On the other hand, in segments in the feeding portion 13 and segments in the extruding portion 15, the abrasion amounts are low with 0.05% or less. Therefore, it is found that in the conventional screw for extruder 29, abrasion is generated at a position in the axial direction and the abrasion is easily generated particularly in the kneading portion.

Figure 6A:
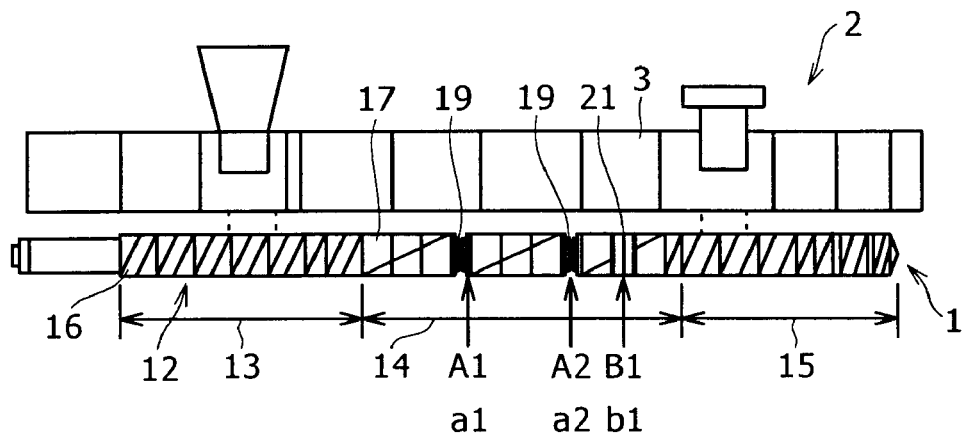
FIG. 6 is a view explaining a change in an abrasion amount in the screw for extruder according to the first embodiment at the position in the axial direction.
Figure 6B:
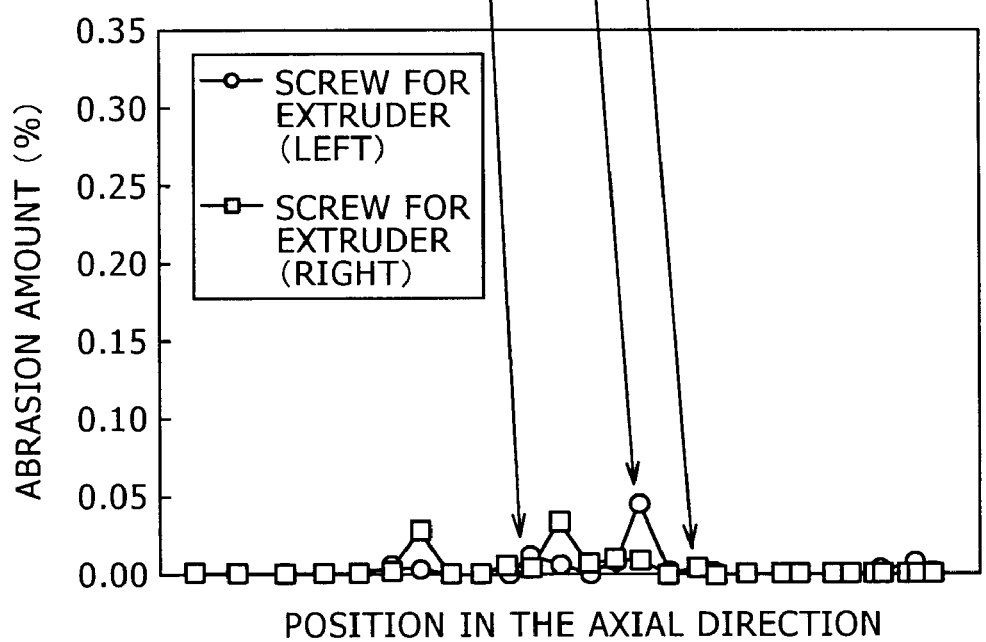

FIG. 6 shows the screw for extruder 1 of the first embodiment. In the screw for extruder 1, is provided the bearing segment 21 shown in FIG. 2B after the seventh rotor segment in the eight rotor segments 17 provided in the kneading portion 14. The bearing segment 21 is provided at a position corresponding to the kneading portion 14 (a position adjacent to any of the kneading segment 36). The position thereof in the axial direction is shown by B1 in FIG. 6A and the abrasion amount thereof is shown by b1 in FIG. 6B.

The abrasion amounts of the kneading disk segments 19 provided in A1 and A2 in FIG. 6A are, as shown in a1 and a2 in FIG. 6B, 0.05% or less. It is found that the above abrasion amounts are extremely lower than the abrasion amounts of the kneading disk segments 19 of the conventional screw for extruder 29. Since the abrasion amounts of the kneading portion 14 in FIG. 6B are 0.05% or less, it is found that at any position in the kneading portion 14, the abrasion is suppressed more than the conventional screw for extruder 29.

Thereby, since the bearing segment 21 is provided within the kneading portion 14, it is possible to prevent the bending of the screw main body 12 and suppress the abrasion of the flights 23a and 23b of the kneading portion 14 and the inner wall of the barrel 3 by the effect of the hydrodynamic bearing of the bearing segment 21.

Length of the kneading portion 14 in the axial direction is 4.5D or more. The bearing segment 21 is provided on the downstream side at a distance of 4.5D or more from an end of the upstream of the kneading portion 14. Thereby, when passing through the kneading portion 14, the material to be kneaded 10 is sufficiently melted and kneaded. The supplied material to be kneaded 10 is melted such that the material to be kneaded 10 can be fed to between the front ends 27a and 27b of the flights 23a and 23b and the inner wall of the barrel 3. Therefore, the sufficiently melted material to be kneaded 10 can exert the effect of the hydrodynamic bearing.

Figure 7A:
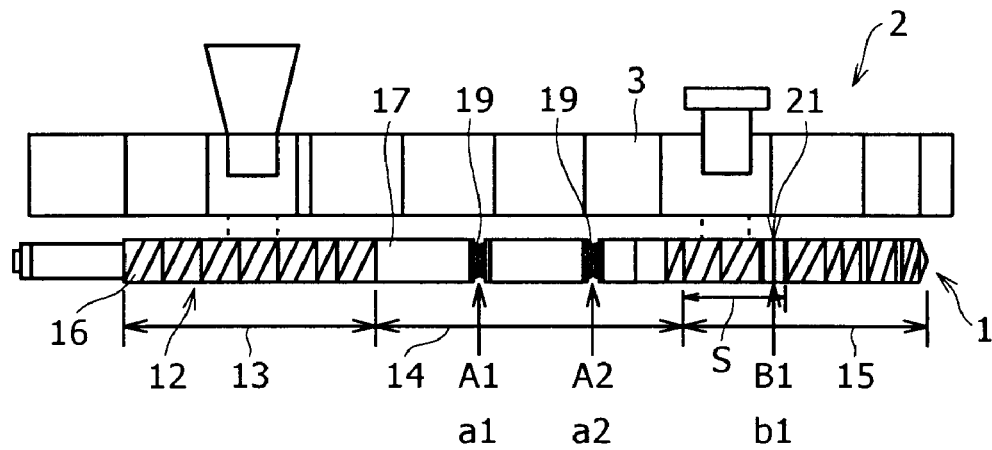
FIG. 7 is a view explaining a change in an abrasion amount in a screw for extruder according to a second embodiment at the position in the axial direction.

FIG. 7A shows the screw for extruder 1 of the second embodiment. In the screw for extruder 1, the bearing segment 21 is provided at a position where a distance S from an end of the downstream of the kneading portion 14 towards the downstream side thereof is 3.0D or less (D: rotational outer diameter of the bearing segment), in the present embodiment, at a position where an end of the downstream of the bearing segment is on the downstream side at a distance of 3.0D from the end of the downstream of the kneading portion 14.

Figure 7B:
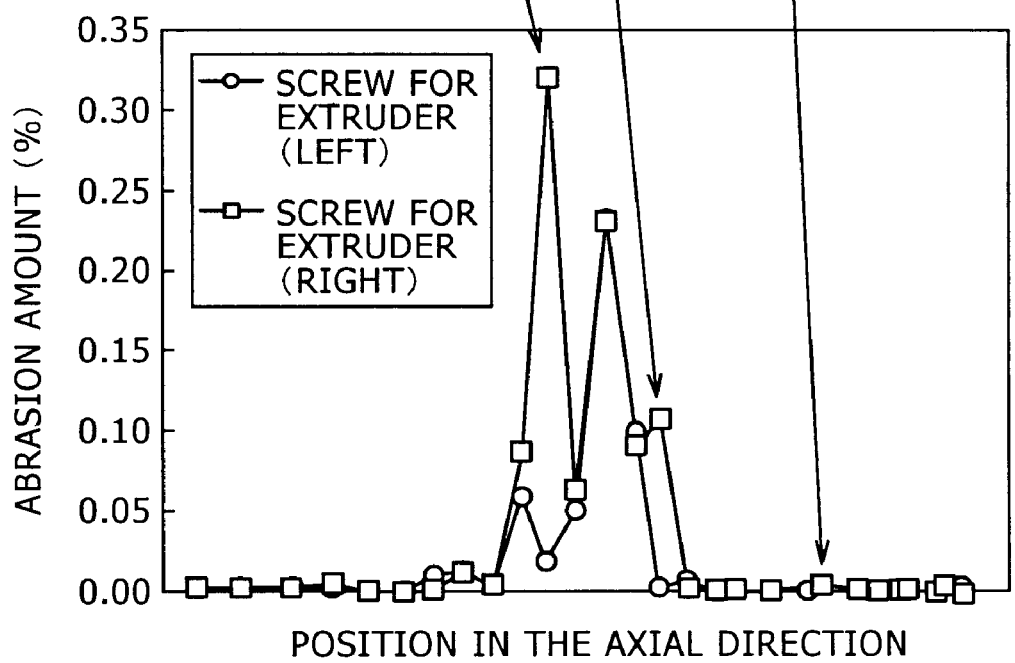

In the screw for extruder 1 of the second embodiment, although the abrasion amounts of the kneading disk segments 19 shown in a1 and a2 in FIG. 7B are larger than the abrasion amounts of the first embodiment (the abrasion amounts of a1 and a2 in FIG. 6B), the abrasion amounts are smaller than the abrasion amounts of the conventional screw for extruder 29 (the abrasion amounts of a1 and a2 in FIG. 5B). In the abrasion amounts of the kneading disk segments 19 according to the present embodiment, the abrasion amount of a2 on the closer side to the bearing segment 21 is smaller than the abrasion amount of a1.

Thereby, it is found that by providing the bearing segment 21 on the downstream side at a distance of 3.0D or less from the end of the downstream of the kneading portion 14, it is also possible to prevent the bending of the screw main body 12 and suppress the abrasion of the flights 23a and 23b of the kneading portion 14 and the barrel 3.

In the present embodiment, the length of the kneading portion 14 of the screw for extruder 1 in the axial direction is 4.5D or more, and the bearing segment 21 is provided on the downstream side at a distance of 3.0D or less from the end of the downstream of the kneading portion 14 (that is, S in the figure is 3.0D or less) and at a position in the axial direction on the downstream side at a distance of 4.5D or more from the end of the upstream of the kneading portion 14. Thereby, even in the case where the material supply port 8 is provided on the slightly upstream side of the kneading portion 14, when passing through the kneading portion 14, the material to be kneaded 10 is sufficiently melted and kneaded, and hence the supplied material to be kneaded 10 melted such that the material to be kneaded 10 can be fed to between the front ends 27a and 27b of the flights 23a and 23b and the inner wall of the barrel 3 can exert the effect of the hydrodynamic bearing.

FIG. 8 shows the screw for extruder 1 of the third embodiment. The screw for extruder 1 has a second feeding portion 13b and a second kneading potion 14b following a first feeding portion 13a and a first kneading portion 14a, and the bearing segment 21 is provided at a position corresponding to the first kneading portion 14a.

In the screw for extruder 1 of the third embodiment, it is confirmed that the abrasion amounts of the kneading disk segments 19 of the first kneading portion 14a and the second kneading potion 14b are smaller than the abrasion amounts of a1 and a2 of the second embodiment. Therefore, as in the screw for extruder 1 of the present embodiment, in the case where a plurality of kneading portions 14 are provided in the axial direction of the screw main body 12 being apart from each other, it is determined as preferable that the bearing segment 21 is at least installed in the first kneading portion 14a located on the most upstream side among the plurality of kneading portions 14 provided in the axial direction. This is because there is sometimes a case where with the material to be kneaded 10 located on the more upstream side, a non-melted rate is increased and viscosity is higher, and hence a kinetic load imposed on the screw main body 12 becomes large.

The screw for extruder 1 of the above embodiment can be used in the twin screw extruder 2 of rotating in the reverse direction. The twin screw extruder 2 provided with the screw for extruder 1 is capable of kneading the material to be kneaded 10 by a large shear force, as well as suppressing the abrasion of the screw main body 12 and the barrel 3 so as to improve durability of the twin screw extruder 2.

It should be noted that although the rotor segments 17 and the kneading disk segments 19 are used as the kneading segment 36 in the above embodiment, the kneading segment 36 may be formed by at least the rotor segments 17 or the kneading disk segments 19. When using by combining the rotor segments 17 and the kneading disk segments 19 with each other, it is possible to arbitrarily set the number of segment to be combined. In the rotor segments 17, the clearance portions 28a and 28b (tip portions) having a constant tip clearance can be formed.

We claim:

1. A screw for an extruder, comprising:
    a feeding portion, a kneading portion, and an extruding portion arranged in sequence along the length of the screw, from upstream to downstream in the direction of conveyance of material by the rotation of the screw, wherein the feeding portion and the extruding portion are each comprised of a screw element;
    the kneading portion including a kneading segment, the kneading segment having at least two kneading elements, each kneading element comprising either a kneading disk segment or a rotor segment with two kneading tip portions or more, for kneading the material to be kneaded, the kneading portion having a kneading element at each end thereof along the length of the screw; and
    a bearing segment provided within said kneading portion and upstream of the screw element of said extruding portion, wherein
    said bearing segment is provided with at least two axially spaced bearing elements, each bearing element having only one tip portion in the circumferential direction, wherein the tip portions of the bearing elements are uniformly angularly spaced in the rotational direction of the screw, wherein the rotational outer diameter of each bearing element of said bearing segment is uniform over the entire length of the bearing element of said bearing segment in the axial direction of the screw, and wherein the length of each of the bearing elements in the axial direction of the screw is set to 0.2D (D: rotational outer diameter of said bearing segment) or more.

2. The screw for an extruder according to claim 1, wherein the rotational outer diameter of said kneading segment at one of said tip portions is smaller than the rotational outer diameter of said bearing segment at the tip portion thereof 3. The screw for an extruder according to claim 1, wherein a plurality of kneading portions are provided in the axial direction of said screw being apart from each other, and said bearing segment is provided within a first kneading portion located on the most upstream side among the plurality of kneading portions.

4. The screw for an extruder according to claim 1, wherein outer diameters of the bearing elements are gradually reduced towards the upstream of the rotational direction of said bearing segment.

5. A twin screw extruder having two screws rotating and meshing in the same direction, each of said screws comprising:
    a feeding portion, a kneading portion, and an extruding portion arranged in sequence along the length of the screw, from upstream to downstream in the direction of conveyance of material by the rotation of the screw, wherein the feeding portion and the extruding portion are each comprised of a screw element;
    the kneading portion including a kneading segment, the kneading segment having at least two kneading elements, each kneading element comprising either a kneading disk segment or a rotor segment with two kneading tip portions or more, for kneading the material to be kneaded, the kneading portion having a kneading element at each end thereof along the length of the screw; and
    a bearing segment provided within said kneading portion and upstream of the screw element of said extruding portion, wherein
    said bearing segment is provided with at least two axially spaced bearing elements, each bearing element having only one tip portion in the circumferential direction, wherein the tip portions of the bearing elements are uniformly angularly spaced in the rotational direction of the screw, wherein the rotational outer diameter of each bearing element of said bearing segment is uniform over the entire length of the bearing element of said bearing segment in the axial direction of the screw, and wherein the length of each of the bearing element in the axial direction of the screw is set to 0.2D (D: rotational outer diameter of said bearing segment) or more.

6. The screw for extruder according to claim 1, wherein the kneading portion excludes a screw element.

7. The extruder according to claim 5, wherein the kneading portion excludes a screw element.

8. The screw for extruder according to claim 1, wherein the kneading portion comprises only said kneading disk segments or said rotor segments, and said bearing segment.

9. The extruder according to claim 5, wherein the kneading portion comprises only said kneading disk segments or said rotor segments, and said bearing segment.

* * * * *